(12) United States Patent
Hayashi et al.

(10) Patent No.: US 11,677,883 B2
(45) Date of Patent: Jun. 13, 2023

(54) IMAGE FORMING APPARATUS CAPABLE OF EXECUTING JOB BY SEPARATING JOB INTO "JOB EXECUTION PREPARATORY STEP" AND "JOB EXECUTION STEP"

(71) Applicant: KYOCERA Document Solutions Inc., Osaka (JP)

(72) Inventors: Kyoichiro Hayashi, Osaka (JP); Tomihito Doi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/721,805

(22) Filed: Apr. 15, 2022

(65) Prior Publication Data
US 2022/0360676 A1 Nov. 10, 2022

(30) Foreign Application Priority Data
May 7, 2021 (JP) .............................. JP2021-079271

(51) Int. Cl.
*H04N 1/00* (2006.01)
(52) U.S. Cl.
CPC ....... *H04N 1/00464* (2013.01); *H04N 1/0097* (2013.01); *H04N 1/00474* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 2010/0293602 A1* | 11/2010 | Uchida | ................... | H04L 67/02 726/4 |
| 2012/0182432 A1* | 7/2012 | Okamoto | ........... | H04N 1/32523 358/1.15 |
| 2013/0208292 A1* | 8/2013 | Akari | ..................... | G06F 3/1267 358/1.13 |
| 2014/0285826 A1* | 9/2014 | Sato | ...................... | G06F 3/1297 358/1.6 |
| 2016/0026137 A1* | 1/2016 | Yamada | ............. | G03G 15/5075 399/81 |
| 2016/0041798 A1* | 2/2016 | Maekawa | .............. | G06F 3/1287 358/1.15 |
| 2018/0227451 A1* | 8/2018 | Sakamoto | .......... | H04N 1/00018 |
| 2018/0359638 A1* | 12/2018 | Konji | ................ | H04M 1/72412 |
| 2022/0283753 A1* | 9/2022 | Ogasawara | ........... | G06F 3/1253 |

FOREIGN PATENT DOCUMENTS

JP 2010267032 A 11/2010

\* cited by examiner

*Primary Examiner* — Henok Shiferaw
(74) *Attorney, Agent, or Firm* — IP Business Solutions, LLC

(57) ABSTRACT

An image forming apparatus includes an operating mechanism, a storage device, and a control device. The operating mechanism executes a job. The control device functions as a controller. When accepting a request to prepare execution of the job, the controller allows the operating mechanism to prepare the execution of the job to thus generate data for output and allows the storage device to save the data for output. When accepting a request to execute the job, the controller allows the operating mechanism to execute the job based on the data for output.

5 Claims, 5 Drawing Sheets

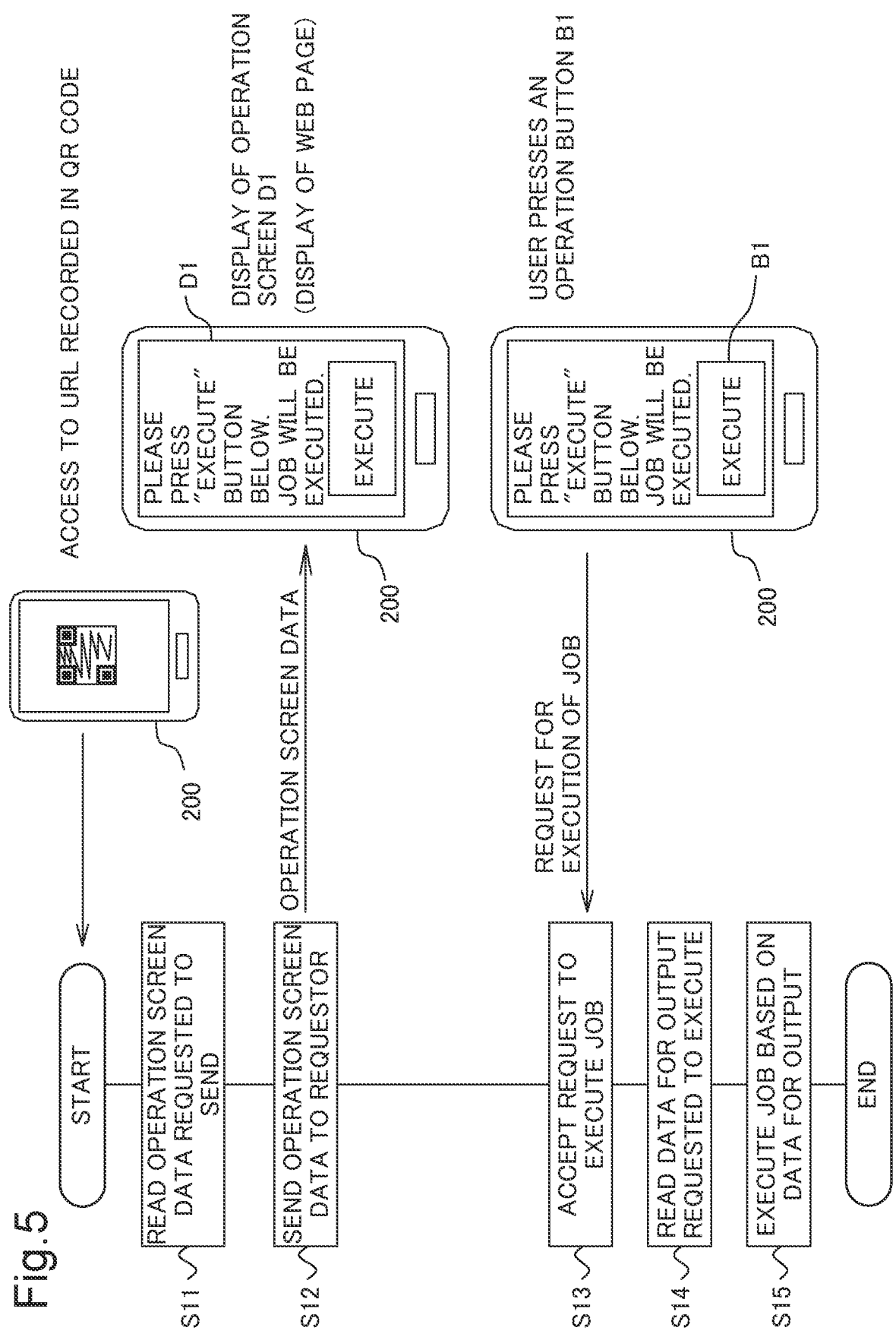

IMAGE FORMING APPARATUS CAPABLE OF EXECUTING JOB BY SEPARATING JOB INTO "JOB EXECUTION PREPARATORY STEP" AND "JOB EXECUTION STEP"

INCORPORATION BY REFERENCE

This application claims priority to Japanese Patent Application No. 2021-079271 filed on 7 May 2021, the entire contents of which are incorporated by reference herein.

BACKGROUND

The present disclosure relates to image forming apparatuses and particularly relates to a technique for managing a job.

Image forming apparatuses are equipped with a technique for managing a job. Users request such an image forming apparatus to execute a job by an operation on a main body panel of the image forming apparatus, an operation via a web browser on the image forming apparatus or like operation. There is known, as an example of a technique for an operation via a web browser on an image forming apparatus, a technique for monitoring a job via a web browser.

SUMMARY

A technique improved over the aforementioned technique is proposed as one aspect of the present disclosure.

An image forming apparatus according to an aspect of the present disclosure includes an operating mechanism, a storage device, and a control device. The operating mechanism executes a job. The control device includes a processor and functions as a controller through the processor executing a control program. When accepting a request to prepare execution of the job, the controller allows the operating mechanism to prepare the execution of the job to thus generate data for output and allows the storage device to save the data for output. When accepting a request to execute the job, the controller allows the operating mechanism to execute the job based on the data for output.

BRIEF DESCRIPTION OF THE DRAWINGS

FIG. 5 is a flowchart showing job execution processing.

DETAILED DESCRIPTION

Figure 1:
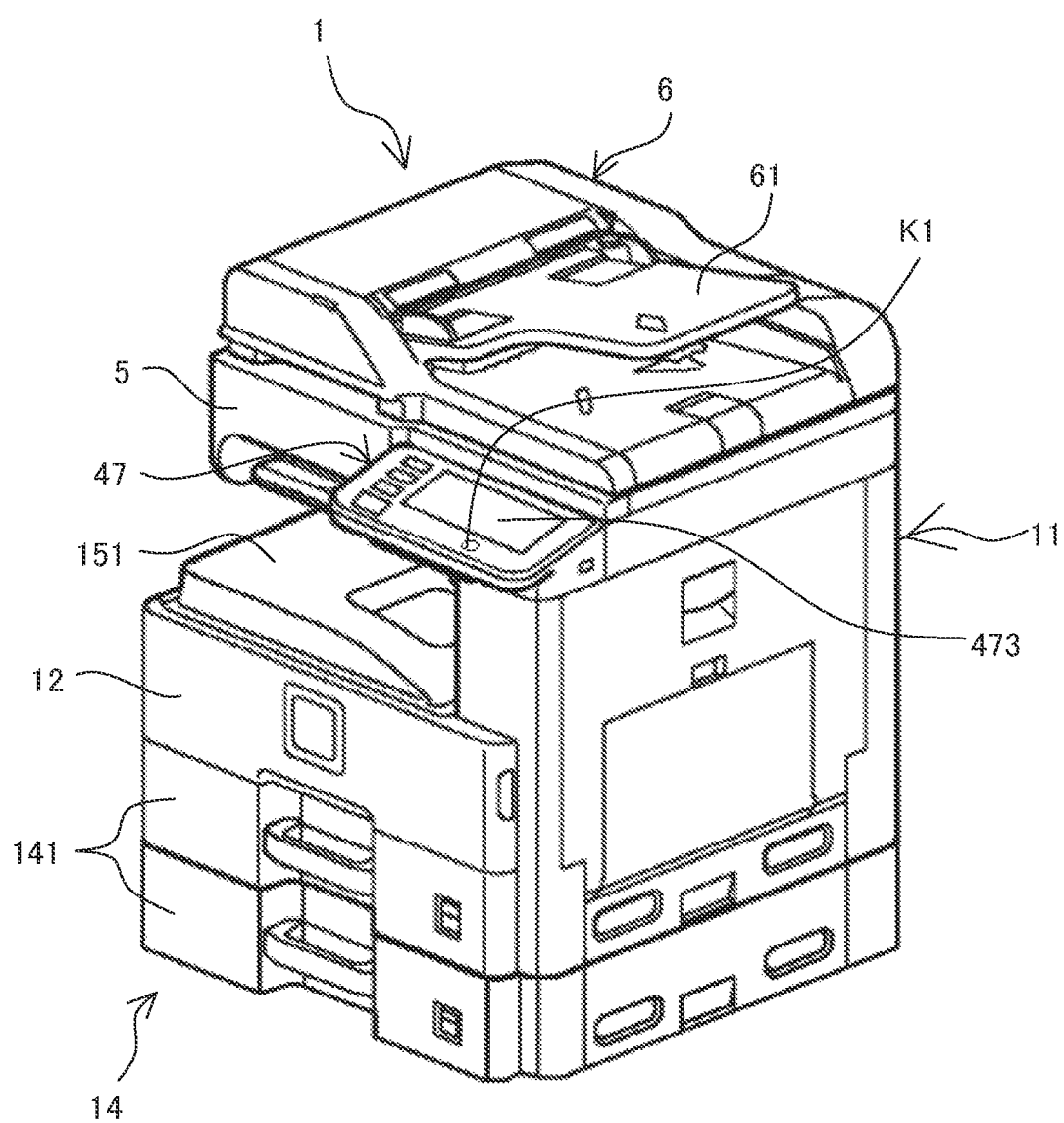
FIG. 1 is a perspective view showing the appearance of an image forming apparatus according to one embodiment of the present disclosure.
Figure 2:
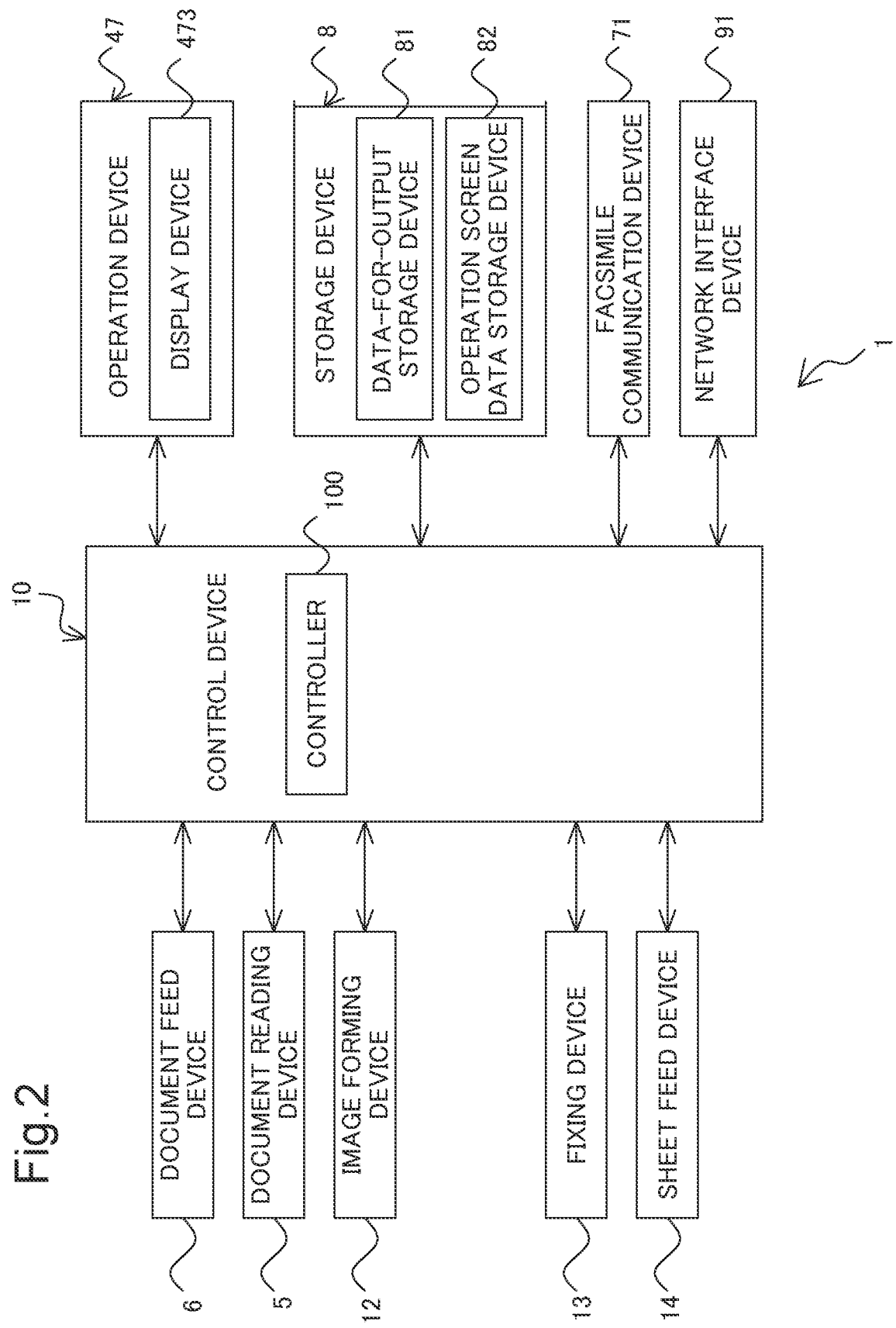
FIG. 2 is a functional block diagram schematically showing an essential internal configuration of the image forming apparatus.

Hereinafter, a description will be given of an image forming apparatus according to an embodiment of the present disclosure with reference to the drawings. FIG. 1 is a perspective view showing the appearance of an image forming apparatus 1 according to an embodiment of the present disclosure. FIG. 2 is a functional block diagram schematically showing an essential internal configuration of the image forming apparatus 1.

The image forming apparatus 1 is, for example, a multifunction peripheral having multiple functions, such as a copy function, a print function, a scan function, and a facsimile function. The image forming apparatus 1 has an apparatus body 11 and the apparatus body 11 contains, as an operating mechanism for executing a job, a control device 10, a document feed device 6, a document reading device 5, an image forming device 12, a fixing device 13, a sheet feed device 14, an operation device 47, a storage device 8, a facsimile communication device 71, and a network interface device 91.

The document feed device 6 is mounted by hinges or the like on the top surface of the document reading device 5 and is thus openable and closable relative to the document reading device 5. The document feed device 6 functions as a document holding cover in reading an original document placed on a platen glass. The document feed device 6 is an automatic document feed device called an ADF (auto document feeder) and includes a document loading tray 61. The document feed device 6 feeds original documents loaded onto the document loading tray 61 to the document reading device 5 sheet by sheet.

First, a description will be given of the case where a document reading operation is performed on the image forming apparatus 1. The document reading device 5 optically reads an image of an original document fed to the document reading device 5 by the document feed device 6 or an image of an original document placed on the platen glass and generates image data on the document image. The image data generated by the document reading device 5 is saved in an image memory or the like.

Next, a description will be given of the case where an image forming operation is performed on the image forming apparatus 1. Based on image data generated by the document reading operation, image data stored in the image memory or the like or image data received from a computer connected via a network, the image forming device 12 forms a toner image on a recording paper sheet as a recording medium being fed from the sheet feed device 14.

The fixing device 13 applies heat and pressure to the recording paper sheet with the toner image formed thereon by the image forming device 12 to fix the toner image on the recording paper sheet. The recording paper sheet subjected to the fixation processing is discharged onto a sheet output tray 151. The sheet feed device 14 includes a plurality of sheet feed cassettes 141.

The operation device 47 accepts user's instructions for various types of operations and processing executable by the image forming apparatus 1 (for example, an instruction to execute an image forming operation). The operation device 47 includes a display device 473 that displays operation guidance and other types of information for the user. The operation device 47 accepts, through a touch panel provided on the display device 473, an input of a user's instruction based on a user's gesture (for example, a touch gesture) on an operation screen being displayed on the display device 473.

Furthermore, the operation device 47 accepts an input of a user's instruction based on a user's operation on a physical key provided on the operation device 47. For example, the operation device 47 is provided with, as the physical key K1, a "Start" key for requesting execution of various jobs including copy, print, send (scan), and facsimile transmission.

The display device 473 is formed of a liquid crystal display (LCD) or the like. The display device 473 is equipped with a touch panel. When the user makes a touch gesture on a button or key displayed on the screen, the touch panel accepts an instruction associated with a point where the touch gesture has been made.

The storage device 8 is a large storage device, such as an HDD (hard disk drive) or an SSD (solid state drive). The storage device 8 stores various types of control programs and includes a data-for-output storage device 81 and an operation screen data storage device 82. The data-for-output storage device 81 and the operation screen data storage device 82 will be described later.

The facsimile communication device 71 includes a coding/decoding device, a modulation/demodulation device, and an NCU (network control unit). The facsimile communication device 71 performs facsimile communication using a public telephone network or another like network.

The network interface device 91 is a communication interface that performs sending and receiving of various types of data to and from external devices (for example, a personal computer or a smartphone) in a local area or on the Internet. The network interface device 91 is an example of the communication device.

The control device 10 includes a processor, a RAM (random access memory), a ROM (read only memory), and a dedicated hardware circuit. The processor is, for example, a CPU (central processing unit), an ASIC (application specific integrated circuit) or an MPU (micro processing unit).

When the processor of the control device 10 operates in accordance with a control program stored in the storage device 8, the control device 10 functions as a controller 100. However, the controller 100 may not be based on the operation of the control device 10 in accordance with the control program, but may be constituted by a hardware circuit. Hereinafter, the same applies to other embodiments unless otherwise stated.

The controller 100 governs the overall operation control of the image forming apparatus 1. The controller 100 is connected to the document feed device 6, the document reading device 5, the image forming device 12, the fixing device 13, the sheet feed device 14, the operation device 47, the storage device 8, the facsimile communication device 71, and the network interface device 91 and controls the operations and so on of these components.

For example, when accepting through the operation device 47 a user's request to execute a copy job, the controller 100 operating in accordance with the contents of the copy job set by the user allows the document reading device 5 to read an image of an original document, subjects image data generated by the document reading device 5 to image processing to generate data for printing, controls the operations of the image forming device 12 and other devices to allow them to do printing based on the data for printing, resulting in formation of an image on a recording paper sheet.

The image forming apparatus 1 is designed to be capable of selecting a job separation mode where the preparation for execution of a job and the execution of the job are separately performed. When the job separation mode is selected, the controller 100 separates the job into the step of preparing the execution of the job and the step of executing the job. When the user inputs an instruction to select the job separation mode, for example, by a touch gesture on a GUI (graphic user interface) being displayed on the screen of the display device 473, the controller 100 selects the job separation mode in response to the instruction.

When, with the image forming apparatus 1 placed in the job separation mode, the contents of a job are set by user's operations on the operation device 47 and the controller 100 accepts a user's request to prepare the execution of the job through the operation device 47, the controller 100 allows the operating mechanism of the image forming apparatus 1 to perform the requested preparation for execution of the job in accordance with the set contents of the job to thus generate data for output and allows the data-for-output storage device 81 to save the generated data for output. In doing so, the controller 100 adds, into the data for output, job execution information indicating how the data for output is to be processed, in accordance with the set contents of the job. When accepting a request to execute the job based on the data for output in response to a user's operation on the operation device 47, the controller 100 allows the operating mechanism of the image forming apparatus 1 to execute the job using the data for output and the job execution information contained in the data for output.

A description will be given of, for example, the case where the user requests to prepare the execution of a copy job when the image forming apparatus 1 is placed in the job separation mode. In accordance with the contents of the copy job set by the user, the controller 100 allows the document reading device 5 to read an image of an original document and subjects image data generated by the document reading device 5 to image processing to generate data for printing (data for output). In doing so, the controller 100 adds, into the data for printing, job execution information indicating the processing of forming an image represented by the data for printing on a recording paper sheet. The controller 100 allows the data-for-output storage device 81 to save the generated data for printing.

When accepting a user's request to execute the copy job based on the data for printing which is the data for output, the controller 100 reads, as a job using the data for output and the job execution information contained in the data for output, the data for printing saved in the data-for-output storage device 81 and controls the operations of the image forming device 12 and other devices to allow them to do printing based on the read data for printing, resulting in formation of an image on a recording paper sheet. In short, when accepting a request to execute the job based on the data for output, the controller 100 allows the operating mechanism to execute the job.

Figure 3:
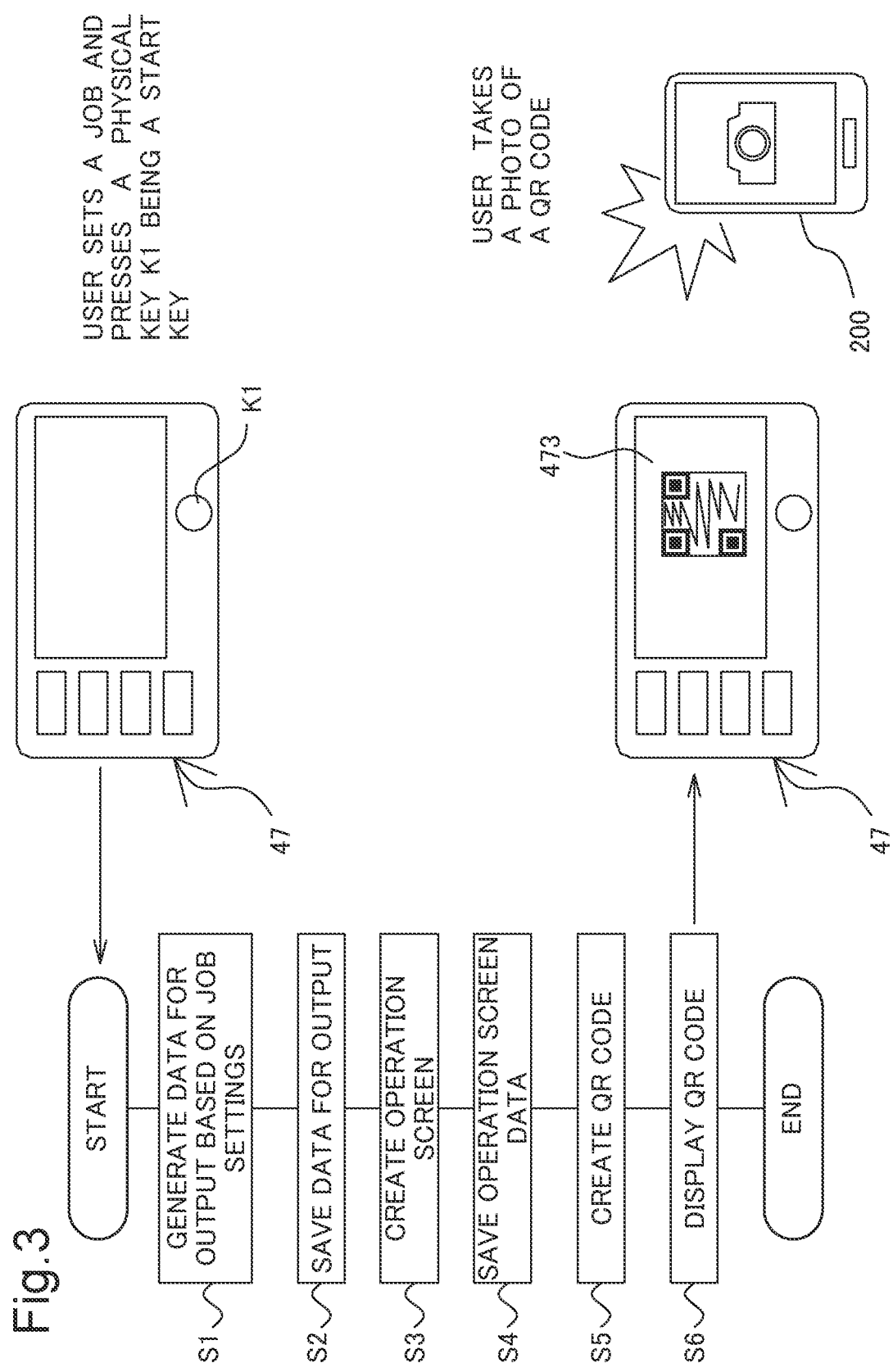
FIG. 3 is a flowchart showing job execution preparatory processing.

Next, a description will be given of job execution preparatory processing to be executed by the image forming apparatus 1 being placed in the job separation mode, with reference to the flowchart shown in FIG. 3 and so on.

When a user sets the contents of a job by operations on the operation device 47 and the operation device 47 accepts a user's request to prepare the execution of the job in response to a user's operation on the "Start" key which is the physical key K1, the controller 100 allows the operating mechanism to execute the processing in accordance with the contents of the job set by the user to thus generate data for output containing job execution information (step S1). The controller 100 allows the data-for-output storage device 81 to save the generated data for output (step S2).

The controller 100 generates operation screen data on an operation screen D1 (see FIG. 4) for use in accepting a request to execute the job based on the data for output from a user (step S3). The controller 100 allows the operation screen data storage device 82 to save the generated operation screen data representing the operation screen D1 (step S4).

Figure 4:
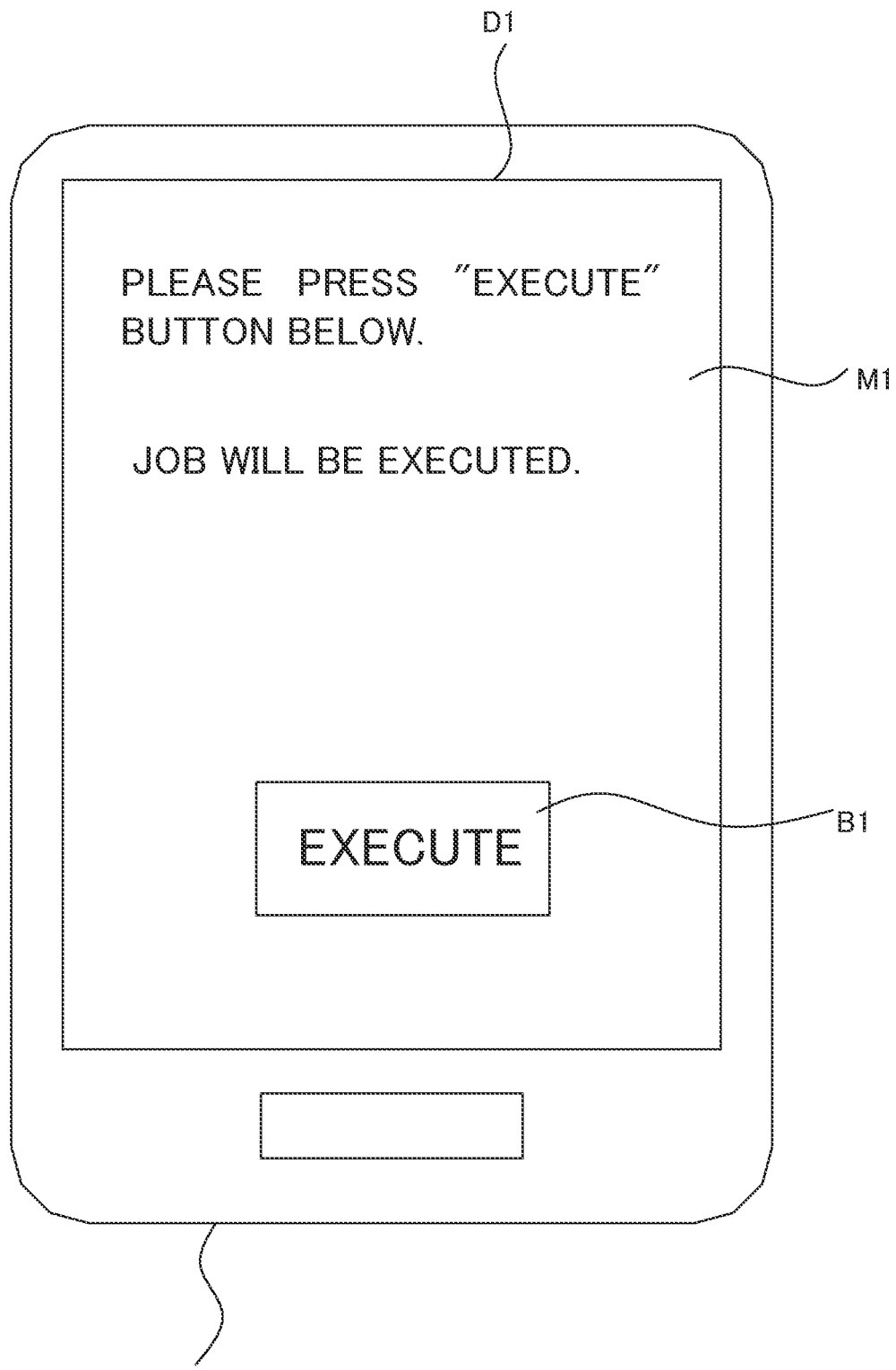
FIG. 4 is a view showing an example of an operation screen.

FIG. 4 shows an example of a state where the operation screen D1 is displayed on a display device of a mobile terminal device 200, such as a smartphone. The operation screen D1 contains a message M1 "PLEASE PRESS "Execute" KEY BELOW. JOB WILL BE EXECUTED."

and an operation button B1 written as "Execute". The operation button B1 is an image for use in accepting a request to execute the job based on the data for output generated in step S1.

Subsequently, the controller 100 creates a QR code (registered trademark) in which storage location information (for example, a URL) indicating a location where the operation screen data is saved is recorded (step S5). The controller 100 allows the display device 473 to display the created QR code (step S6). Thus, the storage location information is provided to the user. After the processing in step S6, the controller 100 ends the execution preparatory processing. The two-dimensional code in which storage location information is to be recorded is not limited to a QR code and may be a barcode or other types of two-dimensional code. As an alternative, the controller 100 may not create a two-dimensional code, but may allow the display device 473 to display a linked URL.

The image forming apparatus 1 contains a web server. The external device, such as the mobile terminal device 200, is equipped with a web browser. The external device accesses the above URL via the web browser and allows the display device of the external device to display as a web page the operation screen D1 represented by the operation screen data saved in the URL.

The user takes a photograph of the QR code being displayed on the display device 473, for example, using the mobile terminal device 200 which is a smartphone having a camera function, the function of reading a two-dimensional code, and a web browser function. The mobile terminal device 200 allows the display device thereof to display the operation screen D1 as a web page as shown in FIG. 4.

Next, a description will be given of job execution processing when the image forming apparatus 1 executes a job based on the data for output saved in the data-for-output storage device 81, with reference to the flowchart shown in FIG. 5 and so on.

When a user accesses the storage location information (the URL) recorded in the QR code, for example, using the mobile terminal device 200 and the network interface device 91 of the image forming apparatus 1 accepts the access, the controller 100 reads from the operation screen data storage device 82 the operation screen data saved in the location indicated by the storage location information (step S11) and sends through the network interface device 91 the read operation screen data to the mobile terminal device 200 which is the requestor (step S12).

In other words, the access of the user to the URL using the external device, such as the mobile terminal device 200, means a request to send the operation screen data saved in the location indicated by the URL.

When receiving the operation screen data sent from the image forming apparatus 1, the mobile terminal device 200 allows the display device thereof to display the operation screen D1 represented by the operation screen data as shown in FIG. 4. When the user makes a touch gesture on the operation button B1 contained in the operation screen D1, the mobile terminal device 200 sends to the image forming apparatus 1, for example, a command code incorporated into the operation button B1 to thus make a request to execute the job based on the data for output saved in the data-for-output storage device 81.

When accepting the above request through the network interface device 91 (step S13), the controller 100 reads from the data-for-output storage device 81 the data for output requested to execute (the data for output specified by the command code) (step S14). The controller 100 allows the operating mechanism of the image forming apparatus 1 to execute the job using the read data for output and the job execution information contained in the data for output (step S15). After the processing in step S15, the controller 100 ends the job execution processing.

A general image forming apparatus does not separate the management of a job into the step of preparing the execution of the job and the step of executing the job, but does it as a continuous work. For example, when a user requests the image forming apparatus to execute a copy job, the image forming apparatus performs a continuous work of reading an image of an original document, subjecting image data representing the document image to image processing to generate data for printing (data for output), and doing printing based on the data for printing, thus completing the copy job. In other words, the "job execution preparatory step" from the reading of an image of an original document to the generation of data for printing and the "job execution step" of doing printing based on the data for printing are not separated.

This general technique is effective when the user demands an immediate execution of a job. However, this technique cannot realize a demand to first implement the preparation for execution of a job, such as reading of an original document and inputting of output conditions of the job, and later receive a result of execution of the job, such as printing or sending.

As another general technique, there is a technique for providing the timing to start the "job execution preparatory step" and the timing to start the "job execution step" separately. An example of this technique is a timer-based transmission function of a facsimile machine. However, the timer-based transmission function is a function specific to facsimile machines and is therefore not versatile because the use case is limited to facsimile transmission. In addition, a facsimile job once set cannot be executed at a different time by a different user.

In the timer-based transmission function, a timer-based transmission is performed at a time designated in the "job execution preparatory step". Therefore, the "job execution step" is not fully independent of the "job execution preparatory step". The time of transmission is changeable after the end of the "job execution preparatory step", but this is nothing more than the changeability of the time of timer-based transmission and the "job execution step" is not separated from the "job execution preparatory step".

As described above, in executing a job in accordance with a user's instruction, the general image forming apparatus continuously executes the "job execution preparatory step" of generating data for output and the "job execution step" of executing a job based on the generated data for output. In addition, the general image forming apparatus deletes the data for output after the execution of the job. To sum up, in the general image forming apparatus, the "job execution preparatory step" and the "job execution step" are not separated, the "job execution step" is executed only once for a single "job execution preparatory step", and both the steps are in a one-to-one correspondence.

Unlike the above general image forming apparatus, in the above embodiment, it is possible to separate the "job execution preparatory step" from the "job execution step" and start the "job execution step" with a timing desired by the user. Therefore, a copy, a print, sending data, facsimile transmission data or so on can be output, without the need to previously set the time of output, with a timing desired by the user.

In addition, when a photograph of a QR code taken by the mobile terminal device 200 or the like is transferred to an external device in use by a different user, the different user can request the "execution of the job". Thus, for example, when a user A previously does the "preparation for execution of a job" for copying meeting materials and different users B and C take a photograph of a QR code with their own mobile terminals and individually request the execution of the job, the users B and C can individually output the meeting materials from the image forming apparatus 1 with their desired timings. In other words, the "job execution preparatory step" and the "job execution step" that would conventionally be in a one-to-one correspondence can be placed into a one-to-many correspondence.

As for the "execution of a job", a time limit is preferably set. In another embodiment, the controller 100 accepts, through a user's operation on the operation device 473, a setting of a time limit for the execution of a job based on data for output saved in the data-for-output storage device 81. If the accepted time limit for the execution of a job is exceeded, the controller 100 rejects any request to execute the job and does not execute processing in accordance with the request to execute the job.

For example, if the time limit for execution of a job is exceeded, the controller 100 executes, instead of executing the processing in accordance with a request to execute the job, processing for deleting associated data for output from the data-for-output storage device 81 or processing for deleting associated operation screen data from the operation screen data storage device 82.

The controller 100 may accept the setting of the time limit for job execution from the operation device 47 of the image forming apparatus 1 itself or may accept it from an external device, such as the mobile terminal device 200.

The present disclosure is not limited to the above embodiments and can be modified in various ways. Although in the above embodiments a multifunction peripheral is used as an image forming apparatus according to the present disclosure, the multifunction peripheral is merely illustrative and, for example, other image forming apparatuses having a copy function or a print function may be used.

The structure, configuration, and processing of the embodiment described with reference to FIGS. 1 to 5 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an operating mechanism that executes a job;
a storage device; and
a control device including a processor and functioning, through the processor executing a control program, as a controller that:
upon acceptance of a request to prepare execution of the job, allows the operating mechanism to prepare the execution of the job to thus generate data for output and allows the storage device to save the data for output; and
upon acceptance of a request to execute the job, allows the operating mechanism to execute the job based on the data for output,
wherein the controller allows the storage device to save the data for output and creates an operation screen for use in accepting the request to execute the job from a user, and
when accepting the request to execute the job through the operation screen, the controller allows the operating mechanism to execute the job based on the data for output,
wherein the image forming apparatus further comprising a communication device that communicates with an external device,
wherein the controller allows the storage device to save operation screen data representing the operation screen and executes provision processing for providing to the user storage location information indicating a location where the operation screen data is saved,
when accepting a request to send the operation screen data via the communication device from the external device, the controller reads the operation screen data saved in the location indicated by the storage location information and sends the operation screen data via the communication device to the external device, and
when accepting the request to execute the job through the operation screen via the communication device, the controller allows the operating mechanism to execute the job based on the data for output.

2. The image forming apparatus according to claim 1, further comprising a display device,
wherein, as the provision processing, the controller creates a two-dimensional code indicating the storage location information and allows the display device to display the two-dimensional code.

3. The image forming apparatus according to claim 1, wherein
the controller accepts a setting of a time limit for the execution of the job, and
if the time limit for the execution of the job is exceeded, the controller rejects the request to execute the job.

4. The image forming apparatus according to claim 3, wherein if the time limit for the execution of the job is exceeded, the controller deletes the operation screen data from the storage device.

5. The image forming apparatus according to claim 3, comprising, as the operating mechanism, a document reading device that reads an image of an original document and generates image data representing the document image and an image forming device that forms an image on a recording medium,
wherein when accepting a request to prepare execution of a copy job, the controller allows the document reading device to read the image of the original document and allows the storage device to save the generated image data as the data for output, and
when accepting a request to execute the copy job, the controller allows the image forming device to form an image represented by the image data on the recording medium.

* * * * *